(12) United States Patent
Bhat

(10) Patent No.: US 6,191,068 B1
(45) Date of Patent: Feb. 20, 2001

(54) METHOD AND COMPOSITIONS FOR STABILIZATION OF HEAVY METALS, ACID GAS REMOVAL AND PH CONTROL IN CONTAMINATED MATRICES

(75) Inventor: Vasanth K. Bhat, Cincinnati, OH (US)

(73) Assignee: Bhat Industries, Inc., Cincinnati, OH (US)

( * ) Notice: Under 35 U.S.C. 154(b), the term of this patent shall be extended for 0 days.

(21) Appl. No.: 09/244,996

(22) Filed: Feb. 4, 1999

(Under 37 CFR 1.47)

(51) Int. Cl.⁷ ............................. B01J 20/00; C01B 17/00; C01B 7/00; C01B 21/00; B09B 3/00
(52) U.S. Cl. .................. 502/400; 423/242.1; 423/240 S; 423/239.1; 588/249; 588/901
(58) Field of Search ................................. 502/400, 526; 423/242.1, 240 S, 239.1; 252/183.14, 183.16, 182.11; 588/901, 249, 251, 256, 257; 501/45, 47, 49; 210/751, 912, 913, 914

(56) References Cited

U.S. PATENT DOCUMENTS

| | | | |
|---|---|---|---|
| 4,052,190 | * 10/1977 | Berliner | 71/11 |
| 4,671,882 | 6/1987 | Douglas et al. | 210/720 |
| 4,889,640 | 12/1989 | Stanforth | 210/751 |
| 5,037,479 | 8/1991 | Stanforth | 106/691 |
| 5,719,099 | * 2/1998 | Bhat | 423/242.1 |

OTHER PUBLICATIONS

Grant & Hackh's Chemical Dictionary, 5th ed. p. 339, 1987.*

* cited by examiner

Primary Examiner—Steven Bos
(74) Attorney, Agent, or Firm—Oblon, Spivak, McClelland, Maier & Neustadt, P.C.

(57) ABSTRACT

A composition comprising magnesium sulfite, triple super phosphate, and one of limestone and hydroboracite, useful for heavy metal stabilizing, controlling pH and/or removing acid gas from a solid, semi-solid, liquid or gaseous matrix.

12 Claims, No Drawings

METHOD AND COMPOSITIONS FOR STABILIZATION OF HEAVY METALS, ACID GAS REMOVAL AND PH CONTROL IN CONTAMINATED MATRICES

BACKGROUND OF THE INVENTION

1. Field of the Invention

The present invention relates to the treatment of contaminated materials. Specifically, it relates to methods and compositions for rendering inert a broad spectrum of heavy metals that may be present in hazardous and/or toxic matrices such as fly ash and slag from incinerators; process water from ink and paint manufacturing; process dust, water and sludge from ferrous and non-ferrous foundries; electric arc furnace dust, for example, from steel mills; hazardous waste, toxic waste, soils, sludges and sediments. Heavy metals including antimony, arsenic, barium, beryllium, cadmium, chromium, cobalt, copper, lead, mercury, molybdenum, nickel, selenium, silver, thallium, vanadium and zinc are reduced to a level of permanent stability meeting the glacial acetic acid leachate criteria set forth by the U.S. EPA in the Toxicity Characteristic Leaching Procedure (TCLP) and the water leach tests, for example, California or Indiana Water Leach Test, simulating leaching due to rain as it actually occurs in the environment, the most recent versions of such procedure and tests as of Feb. 1, 1998, incorporated herein by reference. The invention also relates to industrial processes that require acid gas removal from a contaminated matrix and pH control of a contaminated matrix.

2. Discussion of the Background

When biologically available, heavy metals leaching from soil, water or waste, as well as those released into the air are detrimental to all living beings. Permissible levels of heavy metal pollution are regulated by the local, state and federal authorities. Important sets of federal regulations include the Resource Conservation and Recovery Act (RCRA) and the Comprehensive Environmental Response, Compensation, and Liability Act (CERCLA), which governs the Superfund program. One of the earliest remediation methods, the removal and hauling of heavy metal contaminated waste and soil to a landfill, while still in use, is being viewed by the public and the press as unacceptable. New regulations and continued desire to find better and/or inexpensive environmental pollution control, prevention and remediation techniques have driven potential hazardous and/or toxic waste generators toward new technologies. Encapsulation of heavy metal contaminated waste in Portland cement, for example, though meeting the letter of the environmental law, does not meet the spirit of the law when the encapsulated waste is exposed to rain. Heavy metals go into solution and become biologically available. Permanent stabilization by forming geochemically stable compounds of heavy metals is by far the best solution to this challenge. Certain industrial processes may also release acid gases which need to be removed. Often pH control of the contaminated matrix is also required.

Numerous methods, mostly multi-step and sequential-step, have been utilized to prevent the leaching of hazardous heavy metals in solid, semi-solid, liquid and/or gaseous complex matrices so that the waste is rendered suitable for disposal in a sanitary landfill. There has, however, been no suggestion to use sulfur-containing material such as magnesium sulfite (scrubber magnesium product) and/or boron-containing material such as hydroboracite for the purpose of providing heavy metal stabilization; to use hydroboracite, by itself for acid gas removal and pH control of the contaminated or treated matrix. Furthermore, there has been no suggestion of the use of phosphates such as triple super phosphate, phosphate rock, fines generated from screening and combining of phosphate fertilizers (TSP (triple super phosphate), MAP (monoammonium phosphate), DAP (diammonium phosphate), etc.) along with magnesium sulfite (scrubber magnesium product) and/or hydroboracite and/or limestone for the purpose of providing heavy metal stabilization, together with the additional benefits of acid gas removal and pH control, to contaminated or treated matrices in a single-step method or single-product composition.

U.S. Pat. No. 4,671,882 to Douglas discloses a multi-step process for heavy metal stabilization. Douglas does not prefer to use limestone because he believes that the use of limestone results in the production of carbon dioxide gas when added to acid solution and such gas would adversely affect the pH increasing step essential to his multi-step heavy metal stabilization process. Both U.S. Pat. Nos. 4,889,640 and 5,037,479 to Stanforth teach away from the use of limestone in his single-step and sequential-step heavy metal stabilization processes because he considers it as a non-reactive form of calcium and/or magnesium carbonate and a hinderance to heavy metal stabilization. The above-mentioned patents do not suggest any products or processes for acid gas removal.

OBJECTS OF THE INVENTION

It is the primary object of the present invention to provide a one-step method and single-product compositions that simultaneously stabilize heavy metals, remove acid gases and control pH in contaminated solid, semi-solid, liquid and/or gaseous complex matrices It is a further object of the present invention to provide a new method for the simultaneous treatment of a wide variety of matrices including in-process and waste materials contaminated with a broad range of heavy metals classified by the U.S. EPA as hazardous, such that geochemically stable, substantially non-leaching compounds of heavy metals are formed and the contaminated matrices are rendered inert.

It is another object of the present invention to provide a new family of compositions that achieve permanent stability of leachable heavy metals in complex matrices exposed to actual environmental conditions.

It is still another object of the present invention to provide a method and a general range of compositions that stabilize more heavy metals than those in the prior art using a one-step treatment and using a single product which may contain one or more reactive agents.

It is yet another object of the present invention to provide a method and compositions that are more cost-effective than those of the prior art in stabilizing heavy metals in a wide variety of complex matrices.

SUMMARY OF THE INVENTION

In accordance with the present invention there is provided a method and compositions for the treatment of in-process hazardous materials and waste materials contaminated with hazardous heavy metals to or below levels of local, state and federal regulatory limits. Simultaneously, this invention provides a single-step method and single-product and multiple-product compositions for heavy metal stabilization, acid gas removal and pH control in contaminated complex matrices.

Specifically, the present invention relates to a multiple-product composition for the treatment of heavy metal-containing matrices comprising an effective amount of sulfur-containing material such as magnesium sulfite and at least one of limestone and/or boron-containing material such as hydroboracite and/or phosphate-containing materials (P) such as triple super phosphate, rock phosphate, phosphate fines or combinations thereof. Methods of using single-product compositions are also described.

DETAILED DESCRIPTION OF THE INVENTION

The objects set out above are preferably accomplished using one composition and a one-step application method, as opposed to using several different compositions and a multi-step or sequential application method to:

(1) stabilize a broad spectrum of heavy metals including those listed by the U.S. EPA as hazardous (Table I);

(2) control acid gases found in complex matrices, including industrial processes and waste; and (3) control pH of the contaminated and treated matrices.

This invention relates to compositions and methods for accomplishing these goals, as well as to method for preparing those compositions.

TABLE I

U.S. EPA List of Hazardous Heavy Metals

| Antimony | Cadmium | Lead | Selenium | Zinc |
|---|---|---|---|---|
| Arsenic | Chromium | Mercury | Silver | — |
| Barium | Cobalt | Molybdenum | Thallium | — |
| Beryllium | Copper | Nickel | Vanadium | — |

Ingredients that form salts of low solubility with the heavy metals in question here will also produce permanently stable, pH independent, complex, non-leaching compounds that immobilize the heavy metals when they contain glass network forming cations such as Si, B, P, Ge and mixtures thereof, and glass network forming anions such as O, S, Se, Te and mixtures thereof. In conjunction with ingredients containing the glass network forming ions, those containing network dwellers such as Al, Mg, Ga and mixtures thereof, and network modifiers such as Ca, Mg and mixtures thereof, are also found to help in stabilizing heavy metals contained in contaminated matrices. It is not necessary that glass actually be formed as a result of the reaction between heavy metals and the heavy metal stabilizer, but rather that the ingredients used to prepare the heavy metal stabilizers be capable of forming glass. It is preferred that salts of low water solubility (preferably less than 750 parts per billion) are formed as a result of the reaction between these ions and the heavy metals.

Thus, the invention provides permanently stable, pH independent, complex, non-leaching compounds that mobilize the heavy metals. In selecting the ingredients for heavy metal stabilizing compositions, it is preferred that they are capable of forming glass (that is, they contain glass network forming, network dwelling and/or network modifying ions), and that salts of low solubility are formed as a result of the reaction between these ions and the heavy metals in question. Sulfur-containing material such as magnesium sulfite or boron-containing material such as hydroboracite are compounds that fit both these criteria by themselves, as well as in conjunction with other ingredients.

Sulfonated Calcium Aluminum Magnesium Phosphate (SCAMP) referred to in U.S. Pat. No. 5,719,099 by itself outperforms phosphate fines referred to above in heavy metal stabilization. However, when either SCAMP or P is combined in the presence of SMP (Scrubber Magnesium Product), with other ingredients such as hydroboracite (HB) or limestone (L) (the term "limestone" as used herein refers to limestone in the uncalcined or calcined state, of either high-calcium or dolomitic type and mixtures thereof), there appears to be no significant difference in performance between them as far as heavy metal stabilization. Stabilization of all 17 heavy metals listed as hazardous by the U.S. EPA can be accomplished in a single-step, along with acid gas and pH control using a product composition that comprises, consists of, or consists essentially inorganic sulfur-containing material(s) (such as magnesium sulfite, magnesium sulfate, calcium sulfite, sodium metabisulfite, calcium magnesium sulfite, epsom salt, gypsum, mixtures thereof) and P. An inexpensive source of magnesium sulfite that also contains minor amounts of magnesium sulfate is the Scrubber Magnesium Product (SMP). The use of inorganic sulfur-containing material (for example, SMP) alone, does stabilize 15 of the 17 heavy metals fairly well. Thus, this embodiment makes up part of the invention. Relative effectiveness of SMP alone or in combination with P is shown in Table II. The use of Hydrated Calcium Magnesium Borate, that is, Hydroboracite (HB), alone or in conjunction with SMP, P and mixtures thereof is also depicted in Table II. Use of limestone (L) in lieu of hydroboracite in conjunction with SMP and P produces somewhat similar results in acid removal and pH control, but hydroboracite is superior to limestone in heavy metal stabilization applications. Nevertheless, when 1:1 substitution (by weight) of hydroboracite to limestone is made, formulae containing SMP, P and limestone have been only slightly inferior to those containing SMP, P and HB in heavy metal stabilization applications. Because limestone is cheaper than hydroboracite, it may be chosen over hydroboracite in formulae containing SMP and SCAMP or SMP and P for heavy metal stabilization applications. In fact, even in the absence of HB and SMP, P+L combinations such as triple super phosphate and limestone or phosphoric acid and limestone show that certain heavy metals (for example, Sb, Be, Cd, Cr. Cu. Pb, Mo, Tl, V, Zn) can be cost-effectively stabilized. If acid gas removal and/or pH control is the only objective, formulae containing materials selected from a group consisting of limestone, calcined magnesite, hydroboracite, or zeolites, and mixtures thereof, work very well.

The compositions of the present invention comprise an amount of each specified component which is effective to stabilize heavy metals present in the matrix being treated, as well as to control pH and acid gas. Specifically, compositions of the present invention contain from about 0% to 100%, preferably from about 10% to 50% inorganic sulfur-containing material such as SMP, from about 0% to 100%, preferably from about 0% to 50% HB, from about 0% to 90%, preferably from about 10% to 50% P, and from about 0% to 90%, preferably from about 0% to 80% L. Examples of SMP-, HB-, P- and L-containing compositions found to be effective in achieving the goals of the present invention are as follows:

| Ex. # | SMP wt % | HB wt % | P wt % | L wt % |
|---|---|---|---|---|
| 1 | 100 | — | — | — |
| 2 | 30–40 | — | 35–45 | 20–30 |
| 3 | 10–20 | — | 10–20 | 50–70 |
| 4 | 10–20 | — | 15–25 | 40–60 |
| 5 | 30–40 | — | 15–25 | 40–50 |

-continued

| Ex. # | SMP wt % | HB wt % | P wt % | L wt % |
|---|---|---|---|---|
| 6 | — | 100 | — | — |
| 7 | — | 30–40 | 35–45 | 20–30 |
| 8 | — | 10–20 | 10–20 | 50–70 |
| 9 | — | 10–20 | 15–25 | 40–60 |
| 10 | — | 30–40 | 15–25 | 40–50 |
| 11 | — | — | 40–90 | 10–60 |

When the compositions of the present invention are used for the stabilization of specific heavy metals as depicted in Table II, the end result is an inert, environmentally safe product of the reaction between a heavy metal-containing matrix and the composition containing up to about 30% (by weight) glass network forming cations and up to about 35% network forming anions, up to about 60% glass network dwelling ions, and up to about 70% glass network modifying ions.

TABLE II

Relative Effectiveness in Stabilizing Heavy Metals

| Heavy Metal | SMP | HB | P | SMP + P | HB + P | SMP + HB | SMP + HB + P |
|---|---|---|---|---|---|---|---|
| Sb | Fair | Fair | Poor | Fair | Good | Good | Good |
| As | Fair | Poor | Poor | Fair | Fair | Fair | Fair |
| Ba | Fair | Poor | Fair | Good | Fair | Fair | Good |
| Be | Fair | Fair | Poor | Fair | Good | Good | Good |
| Cd | Fair | Fair | Fair | Good | Good | Good | Good |
| Cr | Fair | Fair | Fair | Good | Good | Good | Good |
| Co | Poor | Fair | Fair | Fair | Fair | Fair | Good |
| Cu | Fair | Fair | Poor | Fair | Good | Good | Good |
| Pb | Fair | Fair | Fair | Good | Good | Good | Good |
| Hg | Fair | Fair | Fair | Good | Good | Good | Good |
| Mo | Fair | Fair | Poor | Fair | Good | Good | Good |
| Ni | Poor | Fair | Fair | Fair | Fair | Fair | Good |
| Se | Fair | Poor | Poor | Fair | Fair | Fair | Fair |
| Ag | Fair | Poor | Fair | Good | Fair | Fair | Good |
| Tl | Fair | Fair | Poor | Fair | Good | Good | Good |
| V | Fair | Fair | Poor | Fair | Good | Good | Good |
| Zn | Fair | Fair | Fair | Good | Good | Good | Good |

In general, compositions for the treatment of heavy metal-containing matrices together with the additional benefits of acid gas removal and pH control, may be prepared by combining the following materials (a) and (b):
  (a) at least one inorganic sulfur-containing material selected from the group consisting of magnesium sulfite, calcium sulfite, magnesium sulfate, sodium metabisulfite, calcium magnesium sulfite, epsom salt, gypsum, and mixtures thereof (preferably magnesium sulfite, calcium sulfite, magnesium sulfate, or calcium magnesium sulfite, and most preferably magnesium sulfite in the form of scrubber magnesium product);
  (b) at least one phosphate-containing material (P) selected from the group consisting of phosphoric acid, rock phosphate, triple super phosphate, or fines or mixtures of fines of phosphate fertilizers such as triple super phosphate (TSP), monoammonium phosphate (MAP), diammonium phosphate (DAP) commonly referred to as phosphate fines and mixtures thereof (preferably rock phosphate, TSP or phosphate fines, and most preferably phosphate fines);
  and optionally adding limestone, either uncalcined or calcined, either high-calcium or dolomitic type and mixtures thereof, and further optionally adding HB.
When inorganic sulfur-containing material from (a) such as magnesium sulfite (Scrubber magnesium Product, SMP) alone is used for heavy metal stabilization, of the 17 heavy metals 15 are stabilized; Co and Ni are not. When the above composition of SMP+P is used, all 17 heavy metals including Co and Ni are stabilized with additional performance benefits of acid gas removal and pH control accrued with the addition of limestone.

In general, a boron- and phosphate-containing composition for the treatment of heavy metal-containing matrices together with the additional benefits of acid gas removal and pH control, may be prepared by combining the following materials:
  (a) at least one inorganic boron-containing material selected from the group consisting of hydroboracite, colemanite, ulexite, borax, and mixtures thereof (most preferably hydroboracite);
  (b) at least one phosphate-containing material selected from the group consisting of phosphoric acid, rock phosphate, triple super phosphate, or fines or mixtures of fines of phosphate fertilizers such as triple super phosphate (TSP), monoammonium phosphate (MAP), diammonium phosphate (DAP) commonly referred to as phosphate fines and mixtures thereof (preferably rock phosphate, TSP or phosphate fines, and most preferably phosphate fines);
  and optionally adding limestone, of either uncalcined or calcined state, of either high-calcium or dolomitic type and mixtures thereof.

When boron-containing material from (a) such as hydroboracite (HB) alone is used, of the 17 heavy metals, only 13 are stabilized; As, Ba, Se, and Ag are not. When the above composition of HB+P is used, all 17 heavy metals including As, Ba, Se, and Ag are stabilized with the additional performance benefits of acid gas removal and pH control accrued without the addition of limestone. Limestone may be optionally included in the formula for cost benefits.

A sulfur- and boron-containing single product composition for the treatment of heavy metal-containing matrices together with the additional benefits of acid gas removal and pH control may be prepared by combining, mixing and reacting the following materials:
  (a) at least one inorganic sulfur-containing material selected from the group consisting of magnesium sulfite, calcium sulfite, magnesium sulfate, sodium metabisulfite, calcium magnesium sulfite, epsom salt, gypsum, and mixtures thereof (preferably magnesium sulfite, calcium sulfite, magnesium sulfate, or calcium magnesium sulfite, and most preferably magnesium sulfite in the form of scrubber magnesium product);
  (b) at least one boron-containing material selected from the group consisting of hydroboracite, colemanite, ulexite, borax, and mixtures thereof (most preferably hydroboracite);
  (c) at least one phosphate-containing material selected from the group consisting of phosphoric acid, rock phosphate, triple super phosphate, or fines or mixtures of fines of phosphate fertilizers such as triple super phosphate (TSP), monoammonium phosphate MAP), diammonium phosphate (DAP) commonly referred to as phosphate fines and mixtures thereof (preferably rock phosphate, TSP or phosphate fines, and most preferably phosphate fines);
  and optionally adding limestone, of either uncalcined or calcined state, of either high-calcium or dolomitic type and mixtures thereof. Although both SMP+HB and SMP+HB+P compositions will stabilize all 17 heavy metals, SMP+HB+P compositions outperform the former.

Matrices contaminated with heavy metals and acid gases as well as those matrices requiring pH control are treated with product compositions of this invention in a dry or slurry form. A product of this invention maybe injected into an in-process dust stream or added and mixed thoroughly with in-process wastewater; or in the case of contaminated soil, it is admixed, for example, in a continuous or batch mixer. The resultant product is found to be environmentally harmless with the heavy metals stabilized, pH controlled and acid gases neutralized.

Compositions of the present invention generally preferably comprise Scrubber Magnesium Product (SMP), Hydroboracite (HB), Phosphate fines of triple super phosphate, monoammonium phosphate, and/or diammonium phosphate, and Limestone (L), either calcined or uncalcined, whether of high-calcium or dolomitic or mixture thereof. Also included is the use of magnesium sulfite, all alone, in any form including as scrubber magnesium product, SMP, for heavy metal stabilization. Hydroboracite, HB, all by itself, as a heavy metal stabilizer or as an acid gas remover or as a pH controller is further included. Each of these materials in a heavy metal stabilizing application successfully stabilizes many heavy metals in contaminated matrices. SMP added to dust, water, sludge, soil or other contaminated matrices in quantities in the range of 3 to 35 percent by weight (based on total weight) has stabilized Sb, As, Ba, Be, Cd, Cr, Cu, Pb, Hg, Mo, Se, Ag, Tl, V, and Zn. Additions in the range of 3 to 35 percent by weight of HB have stabilized Sb, Be, Cd, Cr, Co, Cu, Pb, Hg, Mo, Ni, Tl, V, and Zn.

In heavy metal stabilizing applications, preferred compositions comprising L, SMP, HB, and P, the preferred weight percent of SMP is 30–40, HB+L is 20–30, and P is 35–45 based on total weight. For cost reasons, HB may be partially or completely replaced by L on a 1:1 weight basis. In compositions used for heavy metal stabilization, acid gas removal, and pH control, the preferred weight percent SMP is 10–20, P is 15–25, and L is 40–60 when more focus is placed on heavy metal stabilization; and the preferred weight percent SMP is 10–20, P is 10–20, and L is 50–70 when more focus is placed on acid gas removal (where L may be L, HB or HB+L). These compositions added at 3 to 35 weight percent of the contaminated matrix have successfully stabilized all 17 heavy metals and removed acid gases such as sulfur dioxide and/or hydrogen chloride.

When acid gas removal happens to be the only application, formulae containing materials selected from the group consisting of limestone, calcined magnesite, hydroboracite, or zeolites, and mixtures thereof, work very well. Combinations of limestone, calcined magnesite, and hydroboracite, or these materials alone have removed sulfur dioxide and hydrogen chloride. When nitrogen oxides are present, compositions containing zeolites are required. For acid gas removal and/or pH control applications, a preferred composition comprises limestone, hydroboracite or limestone+hydroboracite 30–40, calcined magnesite 30–40, and zeolite 30–40 weight percent based on total weight. Amount of composition used is preferably at least equal to the stoichiometric amount required to neutralize the acid gases in question and depends on the quantities and types of acid gases generated from the contaminated matrix. The use of the invention compositions and implementation of the methods described herein are within the skill of the ordinary artisan.

| Compositions for use as heavy metal stabilizer (wt % based on total weight) | |
|---|---|
| Triple Super Phosphate[1] | 30–50 wt. % |
| Limestone[2] | 10–30 wt. % |
| Magnesium Sulfite[3] | 30–50 wt. % |
| Triple Super Phosphate[1] | 15–25 wt. % |
| Limestone[2] | 50–70 wt. % |
| Magnesium Sulfite[3] | 0–30 wt. % |
| Triple Super Phosphate[1] | 30–50 wt. % |
| Limestone[2] | 30–40 wt. % |
| Magnesium Sulfite[3] | 30–50 wt. % |
| Triple Super Phosphate[1] | 15–25 wt. % |
| Limestone[2] | 50–80 wt. % |
| Magnesium Sulfite[3] | 0–30 wt. % |
| Triple Super Phosphate[1] | 30–50 wt. % |
| Limestone[2] | 30–50 wt. % |
| Magnesium Sulfite[3] | 25–50 wt. % |

[1]May be substituted by or mixed with other invention phosphate-containing materials (P).
[2]Limestone can be either a high calcium limestone or dolomitic (containing calcium and magnesium) limestone. It can be uncalcined limestone or calcined limestone (that is, lime or dolime) or mixtures thereof. May be partially or completely substituted by hydroboracite on a 1:1 weight basis.
[3]Magnesium sulfite is an inorganic sulfur-containing material. Other inorganic sulfur-containing materials such as scrubber magnesium product, calcium sulfite, magnesium sulfate, sodium metabisulfite, calcium magnesium sulfite, Epsom salt and mixtures thereof can also be used in partial or complete place of magnesium sulfite.
Triple Super Phosphate[1] 15–25 wt. %
Limestone[2] 30–50% wt. %
Magnesium Sulfite[3] 30–50 wt. %

Method or Process of Formulation

Product may be produced as follows:

1. Combine, mix, and react[4] triple super phosphate[1], and limestone[2] in a reactor.

2. Add magnesium sulfite[3]. Continue mixing and reacting.

3. Grind to make powdered product (e.g., hammer mill).

EXAMPLES OF PRODUCTION BATCHING

Example #1

| 2000 lbs | Triple Super Phosphate |
| 1200 lbs | Limestone (100 lbs Dolomitic Limestone and 200 lbs Dolime) |
| 1800 lbs | Magnesium Sulfite |

Example #2

| 4000 lbs | Example #1 |
| 6000 lbs | Limestone (Calcined, that is, Dolime) |

Example #3

| 6000 lbs | Example #1 |
| 6000 lbs | Limestone (Dolime) |

Example #4

| 6000 lbs | Example #1 |
| 4000 lbs | Example #3 |

Example #5

| 8000 lbs | Example #1 |
| 4000 lbs | Limestone (Dolime) |

Alternatively,

| 6000 lbs | Example #1 |
| 6000 lbs | Example #3 |

-continued

Example #6

| 6000 lbs | Example #1 |
| 4200 lbs | Limestone (Dolime) |
| 1800 lbs | Magnesium Sulfite |

[4]Heating unnecessary. Reaction, if any, is acid-base type reaction, which may provide heat in situ, as may grinding.

Method or Process of Application

Matrices contaminated with heavy metals and acid gases as well as those matrices requiring pH control are treated with invention composition (preferably 3–35 weight percent (total weight) dosage), in dry or slurry form. Powdered product is injected into in-process dust stream or added and mixed thoroughly with in-process wastewater; or in the case of contaminated soil, it is admixed in a continuous or batch mixer.

Phosphate fines is a term known in the art to be fines of phosphate fertilizers and can include one or more of triple super phosphate, monoammonium phosphate and diammonium phosphate.

Preferred embodiments of the invention include the following:

A. A method comprising single-step simultaneous combining, mixing and reacting with, and comprising single-product composition to render, complex (solid, semi-solid, liquid and/or gaseous) matrices contaminated with one or more of 17 heavy metals (Sb, As, Ba, Be, Cd, Cr. Co, Cu. Pb, Hg, Mo, Ni, Se, Ag, Tl, V, and Zn), often co-existing with acid gases such as sulfur dioxide, hydrogen chloride, and nitrogen oxides, completely inert, with the pH controlled to safe levels for alternate use or for disposal into sanitary landfills.

B. A method of making a sulfur- and phosphate-containing single-product composition of embodiment A for the treatment of a matrix contaminated with heavy metals often co-existing with acid gases comprising the steps of mixing the following materials:

(a) A sulfur-containing material selected from the group consisting of magnesium sulfite, calcium sulfite, magnesium sulfate, sodium metabisulfite, calcium magnesium sulfite, epsom salt, gypsum, and mixtures thereof (preferably magnesium sulfite, calcium sulfite, magnesium sulfate, or calcium magnesium sulfite, and most preferably magnesium sulfite in the form of scrubber magnesium product);

(b) A phosphate-containing material selected from the group consisting of phosphoric acid, rock phosphate, triple super phosphate, or fines or mixtures of fines of phosphate fertilizers such as triple super phosphate (TSP), monoammonium phosphate MAP), diammonium phosphate (DAP) commonly referred to as phosphate fines and mixtures thereof (preferably rock phosphate, TSP or phosphate fines, and most preferably phosphate fines);

and optionally adding limestone, of either uncalcined or calcined state, of either high-calcium or dolomitic type and mixtures thereof.

C. A method of making a boron- and phosphate-containing single-product composition of embodiment A for the treatment of a matrix contaminated with heavy metals often co-existing with acid gases comprising the steps of mixing the following materials:

(a) A boron-containing material selected from the group consisting of hydroboracite, colemanite, ulexite, borax, and mixtures thereof (most preferably hydroboracite);

(b) A phosphate-containing material selected from the group consisting of phosphoric acid, rock phosphate, triple super phosphate, or fines or mixtures of fines of phosphate fertilizers such as triple super phosphate (TSP), monoammonium phosphate MAP), diammonium phosphate (DAP) commonly referred to as phosphate fines and mixtures thereof (preferably rock phosphate, TSP or phosphate fines, and most preferably phosphate fines); and optionally adding limestone, of either uncalcined or calcined state, of either high-calcium or dolomitic type and mixtures thereof.

D. A method of making a sulfur-, boron- and phosphate-containing single-product composition of embodiment A for the treatment of a matrix contaminated with heavy metals often co-existing with acid gases comprising the steps of mixing the following materials:

(a) A sulfur-containing material selected from the group consisting of magnesium sulfite, calcium sulfite, magnesium sulfate, sodium metabisulfite, calcium magnesium sulfite, epsom salt, gypsum, and mixtures thereof (preferably magnesium sulfite, calcium sulfite, magnesium sulfate, or calcium magnesium sulfite, and most preferably magnesium sulfite in the form of scrubber magnesium product);

(b) A boron-containing material selected from the group consisting of hydroboracite, colemanite, ulexite, borax, and mixtures thereof (most preferably hydroboracite);

(c) A phosphate-containing material selected from the group consisting of phosphoric acid, rock phosphate, triple super phosphate, or fines or mixtures of fines of phosphate fertilizers such as triple super phosphate (TSP), monoammonium phosphate MAP), diammonium phosphate (DAP) commonly referred to as phosphate fines and mixtures thereof (preferably rock phosphate, TSP or phosphate fines, and most preferably phosphate fines);

and optionally adding limestone, of either uncalcined or calcined state, of either high-calcium or dolomitic type and mixtures thereof E. A method according to embodiment B wherein sulfur-containing material is scrubber magnesium product which is the source for magnesium sulfite; and phosphate-containing material is the phosphate fines.

F. A method according to embodiment C wherein boron-containing material is hydroboracite; and phosphate-containing material is the phosphate fines.

G. A method according to embodiment D wherein sulfur-containing material is scrubber magnesium product which is the source for magnesium sulfite; boron-containing material is hydroboracite; and phosphate-containing material is the phosphate fines.

H. A method according to embodiment A wherein said single-product composition is sulfur-containing material, scrubber magnesium product which is the source for magnesium sulfite, used all by itself for heavy metal stabilization of 15 heavy metals exclusive of Co and Ni (that is, Sb, As, Ba, Be, Cd, Cr. Cu. Pb, Hg, Mo, Se, Ag, Tl, V, Zn).

I. A method according to embodiment A wherein said single-product composition is boron-containing material hydroboracite, used all by itself for heavy metal stabilization of 13 heavy metals exclusive of As, Ba, Se, and Ag (that is, Sb, Be, Cd, Cr. Co, Cu. Pb, Hg, Mo, Ni, Th, V, Zn) often coexisting with acid gases.

J. A single-product composition according embodiment B wherein sulfur-containing material is scrubber magnesium product which is the source for magnesium sulfite; phosphate-containing material is the phosphate fines.

K. A single-product composition according to embodiment C wherein boron-containing material is hydroboracite; phosphate-containing material is the phosphate fines.

L. A single-product composition according to embodiment D wherein sulfur-containing material is scrubber magnesium product which is the source for magnesium sulfite; boron-containing material is hydroboracite; and phosphate-containing material is the phosphate fines.

M. A single product composition according to embodiment A wherein when the only objective is to remove acid gases such as sulfur dioxide, hydrogen chloride, and nitrogen oxides, comprises material selected from the group consisting of limestone (of either uncalcined or calcined state, of either high-calcium or dolomitic type, and mixture thereof), calcined magnesite, zeolites, and mixtures thereof.

N. A single-product composition according to embodiment A wherein when the objective is to remove acid gases in addition to heavy metal stabilization and pH control, comprises hydroboracite or limestone (of either uncalcined or calcined state, of either high-calcium or dolomitic type, and mixture thereof), or both.

O. A single-product composition according to embodiment A wherein the objective is to remove acid gases in addition to heavy metal stabilization and pH control, comprises phosphate-containing material such as triple super phosphate, rock phosphate, phosphate fines, phosphoric acid and mixtures thereof and limestone (of either uncalcined or calcined state, of either high-calcium or dolomitic type, and mixture thereof).

P. A method for acid gas removal and/or pH control of a non-heavy metal-contaminated solid, semi-solid, liquid or gaseous matrix, comprising contacting said matrix with a material selected from the group consisting of limestone, calcined magnesite, hydroboracite, zeolites and mixtures thereof, wherein if nitrogen oxides are present zeolite is present in said material.

Highly preferred invention compositions contain, by weight, 16–40% phosphate-containing material (P), 14–36% inorganic sulfur-containing material (e.g., SMP), and 24–70% of L, boron-containing material (e.g., HB), or L+boron-containing material. As noted above and throughout, limestone can be partially or wholly replaced by boron-containing material, and preferably by HB.

While the invention has been described in terms of various preferred embodiments, one skilled in the art will appreciate that various modifications, substitutions, omissions, and changes may be made without departing from the spirit thereof. U.S. Pat. No. 5,719,099 is incorporated herein by reference, as are U.S. provisional application Ser. No. 60/028,935 and U.S. regular application Ser. No. 08/961,823, now U.S. Pat. No. 5,985,778.

I claim:

1. A composition, comprising magnesium sulfite, triple super phosphate, and at least one of limestone and hydroboracite.

2. The composition as claimed in claim 1, wherein said limestone is uncalcined.

3. The composition of claim 1, comprising limestone and hydroboracite.

4. The composition of claim 1, wherein said composition comprises scrubber magnesium product which comprises magnesium sulfite.

5. The composition of claim 3, wherein said composition comprises scrubber magnesium product which comprises magnesium sulfite.

6. The composition of claim 1, comprising, by weight, 16–40% triple super phosphate, 14–36% magnesium sulfite, and 24–70% of at least one of limestone and hydroboracite.

7. A method for the treatment of a heavy metal-coning matrix comprising contacting said matrix with the composition of claim 1.

8. A method for the treatment of a heavy metal-containing matrix comprising contacting said matrix with the composition of claim 3.

9. A method for controlling the pH of a matrix, comprising contacting said matrix with the composition of claim 1.

10. A method for controlling the pH of a matrix, comprising contacting said matrix with the composition of claim 3.

11. A method for removing acid gas from a solid, semi-solid, liquid or gaseous matrix, comprising contacting said matrix wit the composition of claim 1.

12. A method for removing acid gas from a solid, semi-solid, liquid or gaseous matrix, comprising contacting said matrix with the composition of claim 3.

* * * * *